(12) United States Patent
Chen et al.

(10) Patent No.: US 8,086,787 B2
(45) Date of Patent: Dec. 27, 2011

(54) WEAR LEVELING METHOD, AND STORAGE SYSTEM AND CONTROLLER USING THE SAME

(75) Inventors: Ruei-Cian Chen, Taipei County (TW); Chih-Kang Yeh, Kinmen County (TW); Kian-Fui Seng, Miaoli (TW)

(73) Assignee: Phison Electronics Corp., Miaoli (TW)

( * ) Notice: Subject to any disclaimer, the term of this patent is extended or adjusted under 35 U.S.C. 154(b) by 602 days.

(21) Appl. No.: 12/265,973

(22) Filed: Nov. 6, 2008

(65) Prior Publication Data

US 2010/0023675 A1 Jan. 28, 2010

(30) Foreign Application Priority Data

Jul. 23, 2008 (TW) ................................. 97127941 A

(51) Int. Cl.
*G06F 12/00* (2006.01)
(52) U.S. Cl. ................. 711/103; 711/E12.008
(58) Field of Classification Search .................. 711/103, 711/E12.008
See application file for complete search history.

(56) References Cited

U.S. PATENT DOCUMENTS

| | | | | |
|---|---|---|---|---|
| 7,562,202 B2 * | 7/2009 | Potteiger | ..................... | 711/165 |
| 7,613,876 B2 * | 11/2009 | Bruce et al. | ................... | 711/113 |
| 7,649,794 B2 * | 1/2010 | Yeh | ................................ | 365/218 |
| 2009/0113121 A1 * | 4/2009 | Lee et al. | ...................... | 711/103 |
| 2009/0193174 A1 * | 7/2009 | Reid | ............................. | 711/100 |
| 2009/0249052 A1 * | 10/2009 | Sareen et al. | ..................... | 713/2 |
| 2009/0259896 A1 * | 10/2009 | Hsu et al. | ..................... | 714/723 |
| 2009/0287875 A1 * | 11/2009 | Lin | ................................ | 711/103 |
| 2009/0307412 A1 * | 12/2009 | Yeh | ............................... | 711/103 |
| 2010/0161880 A1 * | 6/2010 | You | ............................... | 711/103 |

* cited by examiner

*Primary Examiner* — Kevin Ellis
*Assistant Examiner* — Mehdi Namazi
(74) *Attorney, Agent, or Firm* — J.C. Patents

(57) ABSTRACT

A wear leveling method for a flash is provided, wherein the flash memory includes a plurality of physical blocks grouped into at least a data area and a spare area. The method includes setting a first predetermined threshold value as a wear-leveling start value and randomly generating a random number as a memory erased count, wherein the random number is smaller than the wear-leveling start value. The method also includes counting the memory erased count each time when the physical blocks are erased and determining whether the memory erased count is smaller than the wear-leveling start value, wherein a physical blocks switching is performed between the data area and the spare area when the memory erased count is not smaller then the wear-leveling start value. Accordingly, it is possible to uniformly use the physical blocks, so as to effectively prolong a lifetime of the store system.

20 Claims, 5 Drawing Sheets

WEAR LEVELING METHOD, AND STORAGE SYSTEM AND CONTROLLER USING THE SAME

CROSS-REFERENCE TO RELATED APPLICATION

This application claims the priority benefit of Taiwan application serial no. 97127941, filed on Jul. 23, 2008. The entirety of the above-mentioned patent application is hereby incorporated by reference herein and made a part of this specification.

BACKGROUND

1. Technology Field

The present invention relates to a wear leveling method. More particularly, the present invention relates to a wear leveling method for a flash memory, a storage system and a controller using the same.

2. Description of Related Art

With a quick developing of digital camera, cell phone camera and MP3, demand of storage media by customers is increased greatly. Since a flash memory has the advantages of non-volatile, energy saving, small size and none mechanical structure etc., it is suitable for portable applications, and especially for portable battery-powered products. A memory card is a storage device applying an NAND flash memory as the storage media. Since the memory card has a small size and a large volume, and is easy to be carried, it has been widely used for storing important personal data. Therefore, the flash drive industry becomes a hot industry within the electronics industry recently.

Generally, the flash memory of a flash memory storage system is divided into a plurality of physical blocks, and the physical blocks are grouped into a data area and a spare area. The physical blocks grouped in the data area are used for storing valid data written based on writing commands, and the physical blocks of the spare area are used for replacing the physical blocks in the data area while executing the writing command. To be specific, when the flash memory storage system receives the writing command from a host for writing data in the physical block of the data area, the flash memory storage system selects a physical block from the spare area, and writes old valid data stored in the physical block of the data area to be written and new data into the physical block selected from the spare area, and further associates the physical block written with the new data to the data area. Moreover, the original physical block in the data area is erased and is associated to the spare area. To smoothly access the physical blocks storing data in an alternation approach, the flash memory storage system can provide logical blocks to the host. Namely, alternation of the physical blocks is reflected by recording and renewing a mapping relation between the logical blocks and the physical blocks of the data area within a logical-physical mapping table, so that the host can only perform writing to the provided logical blocks, and the flash memory storage system then can read data from or write data into the mapped physical blocks according to the logical-physical mapping table.

However, erase times of the physical block is limited (for example, the memory blocks may be worn after ten thousand times of erase). If a physical block is only programmed for once, and none programming is performed afterwards, wearing of the block is relatively low. Conversely, if the physical block is repeatedly programmed and erased, wearing of the physical block is relatively high. Therefore, the so-called wearing is number of times that each of the physical blocks is programmed or erased.

When a physical block is damaged due to excessive high wearing extent thereof, the damaged physical block is then put into a bad block area and is no longer used again. Particularly, when a number of the damaged physical blocks is greater than a threshold value, and the undamaged physical blocks are not sufficient for storing data, even if there are still other unworn physical blocks, the flash memory storage system is still judged to be useless. However, some data stored in the storage system may keep unchanged for a long time, for example, after a user stores favourite music files within the storage system, the music files may keep unchanged for a long time. Therefore, wearing extents of different physical blocks can be greatly different.

Accordingly, a wear leveling method is required to effectively prolong a lifespan of the flash memory storage system.

SUMMARY

Accordingly, the present invention is directed to a wear leveling method, which may effectively level wearing of physical blocks of a flash memory, so as to prolong a lifespan of a flash memory storage system.

The present invention is directed to a controller, which can utilize a wear leveling method for managing a flash memory, by which wearing of physical blocks of the flash memory can be effectively levelled for prolonging a lifespan of a flash memory storage system.

The present invention is directed to a storage system, which can utilize the aforementioned block management method to manage a flash memory, by which wearing of physical blocks of the flash memory can be effectively levelled for prolonging a lifespan of a flash memory storage system.

One principle aspect of the present invention provides a wear leveling method, adapted to a flash memory of a storage system, wherein the flash memory includes a plurality of physical blocks grouped into at least a data area and a spare area. The method includes setting a first predetermined threshold value as a wear-leveling start value and randomly generating a random number as a memory erased count, wherein the random number is smaller than the wear-leveling start value. The method also includes counting the memory erased count each time when the physical blocks are erased and determining whether the memory erased count is smaller than the wear-leveling start value, wherein a physical blocks switching is performed between the data area and the spare area when the memory erased count is not smaller then the wear-leveling start value.

Another aspect of the present invention also provides a storage system and a controller thereof. The storage system includes a flash memory, a connector and a controller, wherein the flash memory has a plurality of physical blocks grouped into at least a data area and a spare area. The controller is electrically connected to the flash memory and the connector, and the controller includes a micro-processing unit, a flash memory interface module coupled to the micro-processing unit, a buffer memory, a host interface module and a memory management module. Particularly, the memory management module has a plurality of machine commands that can be executed by the micro-processing unit for implementing the aforementioned wear leveling method for the flash memory.

In order to make the aforementioned and other objects, features and advantages of the present invention comprehensible, a preferred exemplary embodiment accompanied with figures is described in detail below.

BRIEF DESCRIPTION OF THE DRAWINGS

The accompanying drawings are included to provide a further understanding of the invention, and are incorporated in and constitute a part of this specification. The drawings illustrate exemplary embodiments of the invention and, together with the description, serve to explain the principles of the invention.

DESCRIPTION OF EXEMPLARY EMBODIMENTS

Figure 1:
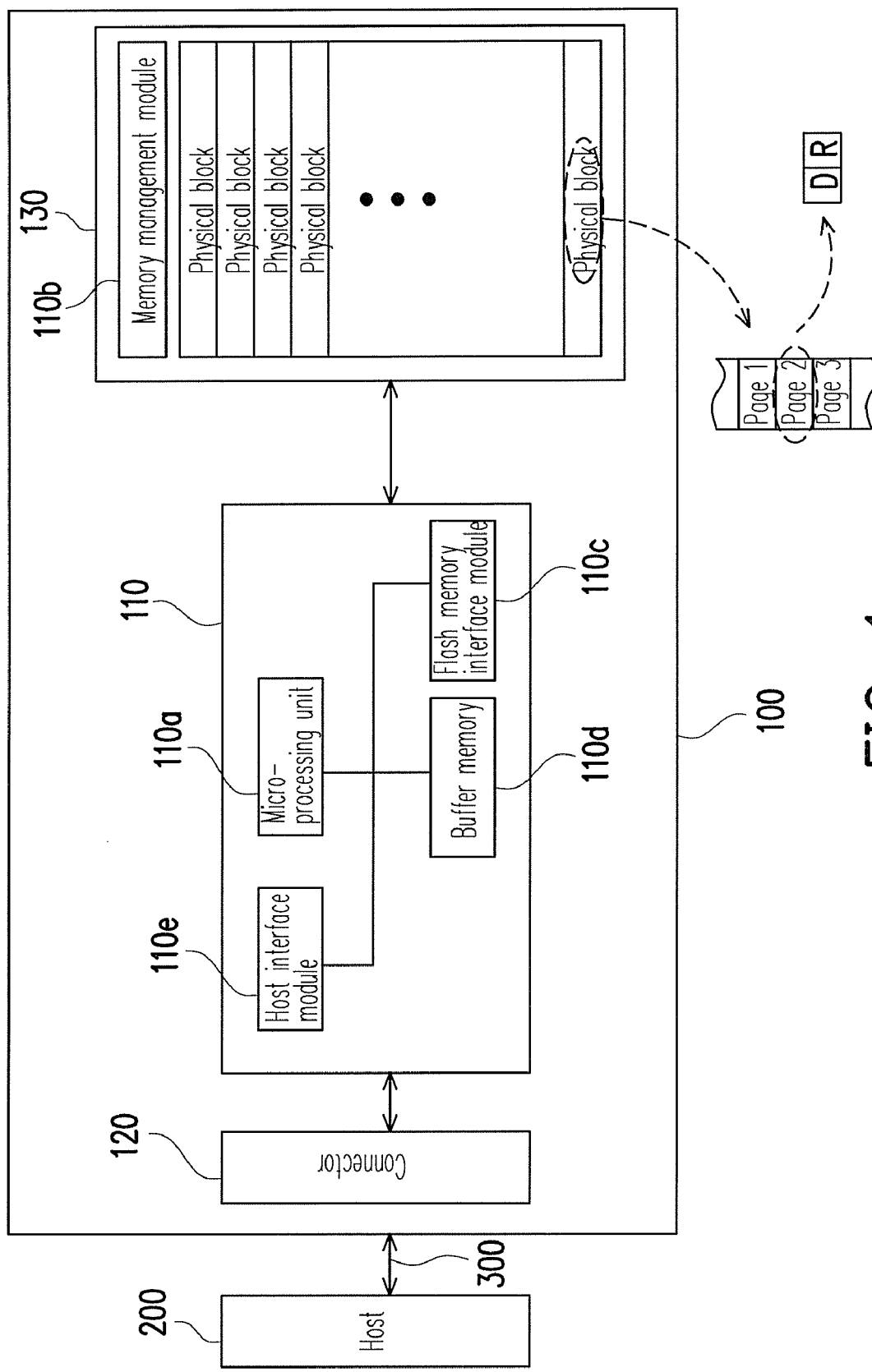
FIG. 1 is a schematic block diagram illustrating a flash memory storage system according to an exemplary embodiment of the present invention.

FIG. 1 is a schematic block diagram illustrating a flash memory storage system according to an exemplary embodiment of the present invention. Referring to FIG. 1, the flash memory storage system 100 includes a controller (which is also referred to as a controller system) 110, a connector 120 and a flash memory 130.

The flash memory storage system 100 is generally utilized together with a host 200, so that the host 200 can write data into the flash memory storage system 100 or read data from the flash memory storage system 100. In the present invention, the flash memory storage system 100 is a solid state drive (SSD). However, it should be noted that in another exemplary embodiment of the present invention, the flash memory storage system 100 can also be a memory card or a flash drive.

The controller 110 can execute a plurality of commands implemented by hardware or software to perform operations such as storing data, reading data and erasing data, etc. in coordination with the connector 120 and the flash memory 130. The controller 110 includes a micro-processing unit 110a, a memory management module 110b, a flash memory interface module 110c, a buffer memory 110d, and a host interface module 110e.

The micro-processing unit 110a is utilized together with the memory management module 110b, the flash memory interface module 110c, the buffer memory 110d and the host interface module 110e to perform various operations to the flash memory storage system 100.

The memory management module 110b is coupled to the micro-processing unit 110a, and has a plurality of machine commands that can be executed by the micro-processing unit 110a for managing the flash memory 130, for example, managing damaged blocks and maintaining a logical-physical block mapping table, etc. Particularly, in the present exemplary embodiment, the memory management module 110b contains machine commands used for implementing a wear leveling method of the present exemplary embodiment (shown as FIG. 3).

In the present exemplary embodiment, the machine commands of the memory management module 110b are stored in a specific area (for example, a system area 202) of the flash memory 130 in a type of firmware, and when the flash memory storage system 100 is operated, the machine commands of the memory management module 110b are loaded into the buffer memory 110d for being executed by the micro-processing unit 110a to implement the wear leveling steps of the present exemplary embodiment.

In another exemplary embodiment of the present invention, the machine commands of the memory management module 110b can also be implemented in the controller 110 via firmware, for example, the memory management module 110b is implemented by coding program-related machine commands via a program language, and storing it into a program memory (for example, a read only memory (ROM)). During operation of the flash memory storage system 100, a plurality of the machine commands of the memory management module 110b is indirectly loaded into the buffer memory 110d for being executed by the micro-processing unit 110a, or is directly executed by the micro-processing unit 110a. Moreover, in another exemplary embodiment of the present invention, the memory management module 110b can also be implemented in the controller 110 via hardware.

The flash memory interface module 110c is coupled to the micro-processing unit 110a for accessing the flash memory 130. Namely, data to be written into the flash memory 130 is first converted into a format that can be accepted by the flash memory 130 via the flash memory interface module 110c.

The buffer memory 110d is coupled to the micro-processing unit 110a for temporarily storing system data (for example, the logical-physical mapping table) or data to be read or written by the host 200. In the present exemplary embodiment, the buffer memory 110d is a static random access memory (SRAM). However, it should be understood that the present invention is not limited thereof, and a dynamic random access memory (DRAM), a magnetoresistive random access memory (MRAM), a phase change random access memory (PRAM) or other suitable memories can also be applied.

The host interface module 110e is coupled to the micro-processing unit 110a for receiving and identifying commands transmitted from the host 200. Namely, the commands and data transmitted by the host 200 are transmitted to the micro-processing unit 110a via the host interface module 110c.

Moreover, though not illustrated, the controller 110 can further include general function modules such as an error correction module and a power management module, etc. for controlling the flash memory.

The connector 120 is used for connecting the host 200 via a bus 300. In the present exemplary embodiment, the connector 120 is a PCI express connector. However, it should be understood that the present invention is not limited thereto, and the connector 120 can also be a USB connector, an IEEE 1394 connector, a SATA connector, an MS connector, an MMC connector, an SD connector, a CF connector, an IDE connector or other suitable data transmission connectors.

The flash memory 130 is electrically connected to the controller 110 for storing data. The flash memory 130 is substantially divided into a plurality of physical blocks. Generally, the physical block is a minimum unit that can be erased within the flash memory. Namely, each of the physical blocks contains a minimum number of memory cells that can be erased together. Each of the physical blocks is generally divided into a plurality of pages, and the page is the minimum unit that can be programmed. It should be noted that according to different designs of the flash memory, the minimum programmable unit can also be a sector, namely, the page can be divided into a plurality of the sectors, and the sector is the minimum unit that can be programmed. In other words, the page is the minimum unit that data can be written on or read from. Each page generally includes a user data area D and a redundant area R. The user data area is used for storing a user data, and the redundant area is used for storing a system data (for example, an error correcting code (ECC)).

The data area D usually has 512 bytes and the redundant area R usually has 16 bytes in order to correspond to the size of a sector in a disk driver. Namely, one page is one sector. However, the page may also include a plurality of the sectors, for example, one page may include 4 sectors.

Generally, the physical block may include arbitrary number of pages, for example, 64 pages, 128 pages, 256 pages etc. The physical blocks are generally grouped into a plurality of zones, and managing of the memory based on the zones results in the fact that the zones can be operated independently, so as to increase a parallel degree of operation, and simplify a complexity of management.

Figure 2A:
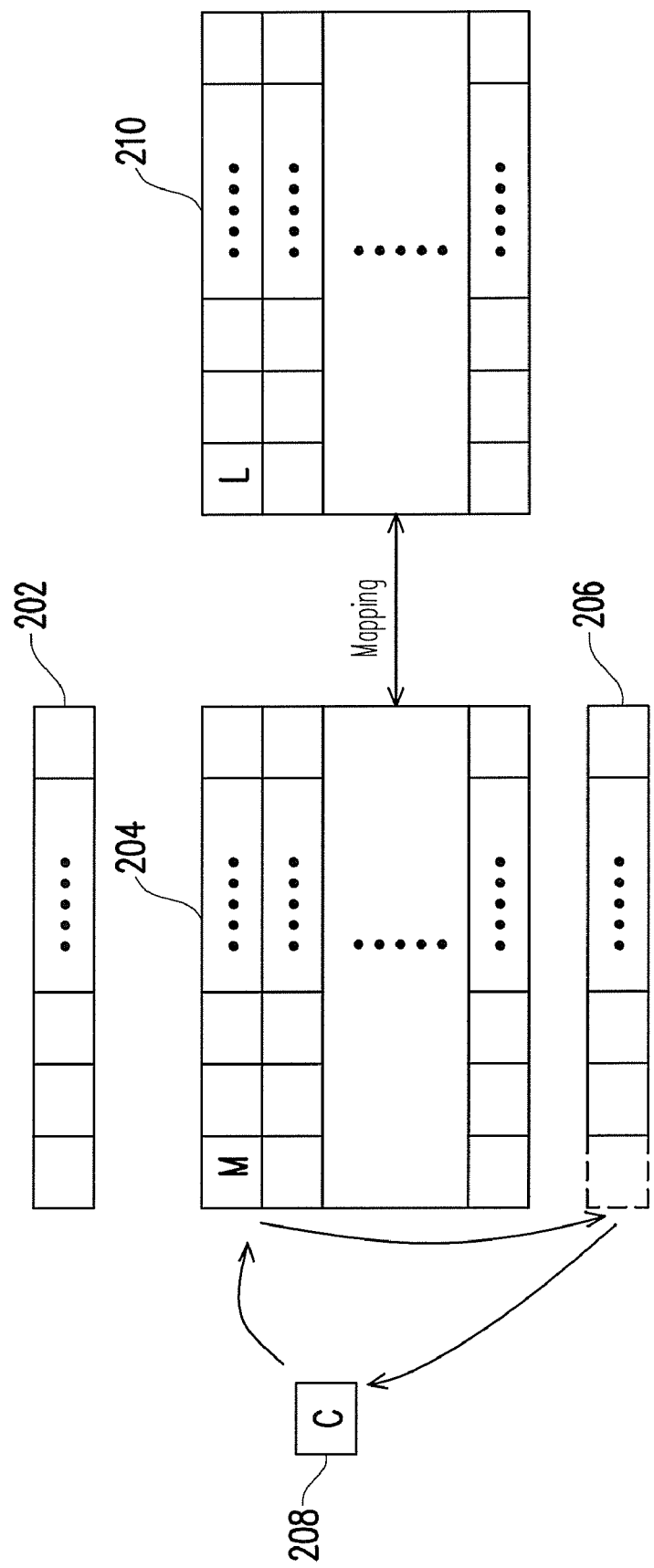
FIG. 2A and FIG. 2B are schematic diagrams illustrating alternation of physical blocks of a flash memory according to an exemplary embodiment of the present invention.
Figure 2B:
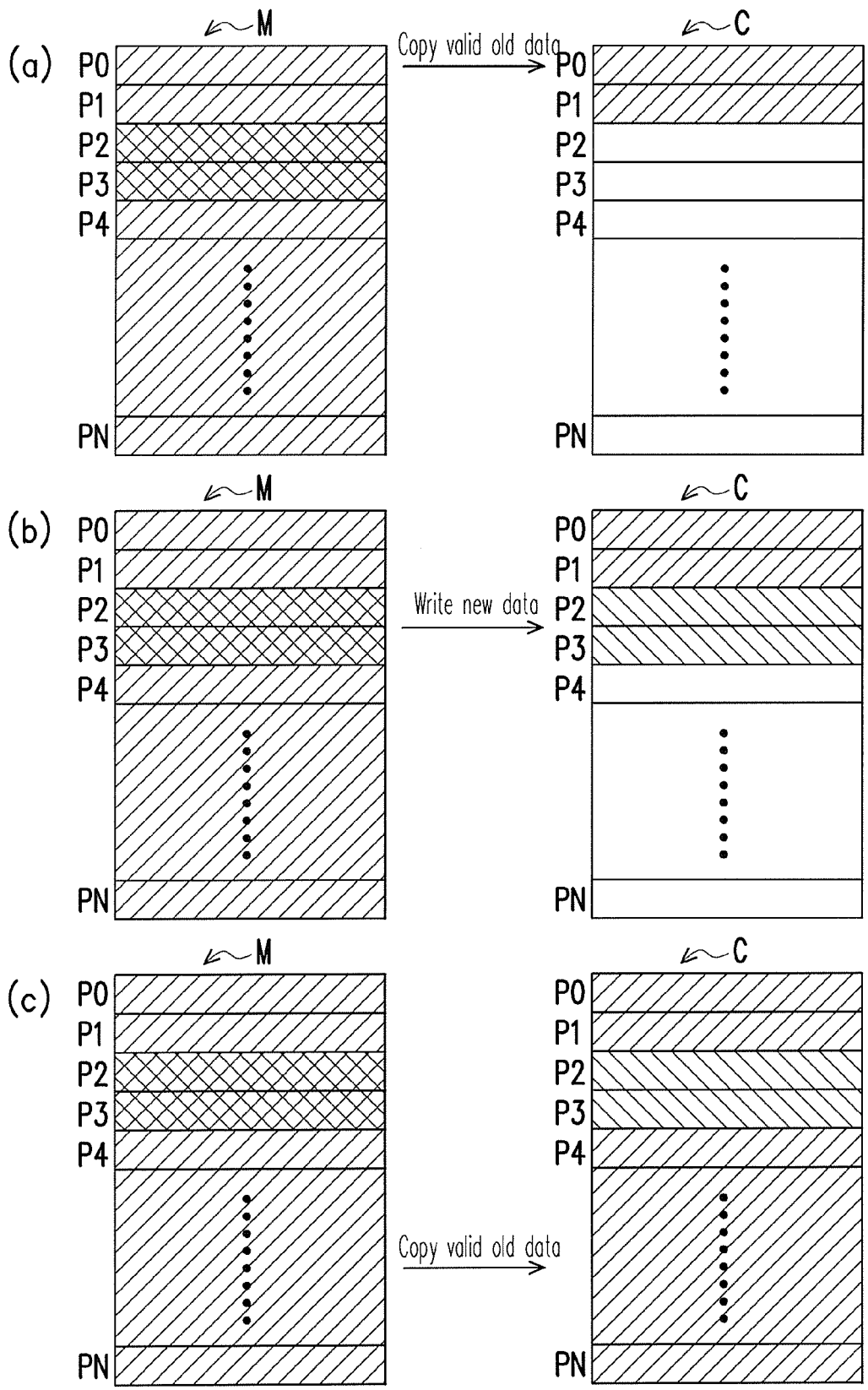

FIG. 2A and FIG. 2B are schematic diagrams illustrating alternation of physical blocks of a flash memory according to an exemplary embodiment of the present invention.

It should be noted that that the terms used herein such as "select", "move", "exchange", "divide" and "group", etc. for operating the physical blocks of the flash memory 130 are only logical concepts. Namely, the physical blocks of the flash memory are only operated logically, and actual positions of the physical blocks are not changed. It should be mentioned that operations of the physical blocks are implemented by executing the machine commands of the memory management module 110b through the controller 110.

Referring to FIG. 2A, in the present exemplary embodiment, to effectively program (i.e. write and erase) the flash memory 130, the controller 110 logically groups the physical blocks of the flash memory 130 into a system area 202, a data area 204 and a spare area 206. Generally, the physical blocks belonged to the data area 204 in the flash memory 130 occupy 90% of all of the physical blocks. As described above, the physical blocks of the flash memory 130 are provided to the host for storing data in an alternation approach. Therefore, the controller 110 can provide the logical blocks 210 to the host for data accessing, and can record the physical blocks mapped to the logical blocks via a logical-physical block mapping table.

The physical blocks in the system area 202 are used for recording the system data, and the system data is for example, area numbers of the flash memory 130, physical block numbers of each area, page numbers of each physical block, and the logical-physical block mapping table recording mapping relations of the logical blocks and the physical blocks, etc.

The physical blocks in the data area 204 are used for storing user data, which are generally physical blocks mapped to the logical blocks 210 accessed by the host 200.

The physical blocks in the spare area 206 are used for replacing the physical blocks in the data area 204. Therefore, the physical blocks of the spare area 206 can be empty or available physical blocks, i.e. blocks that are not stored with data or blocks stored with data marked to be invalid.

To be specific, since each address in the flash memory can only be programmed once, if data is about to be written to the locations with data thereon, erasing of the existing data has to be performed first. However, as mentioned above, the page is the minimum writable unit, and the physical block is the minimum erasable unit. The minimum writable unit is less than the minimum erasable unit. Therefore, if the physical block is desired to be erased, valid pages within the physical block to be erased have to be copied to the other physical blocks first.

For example, when the host desires to write data to a logical block L within the logical blocks 210, the controller 110 obtains information that the logical block L is presently mapped to the physical block M in the data area 204 via the logical-physical mapping table. Therefore, the flash memory storage system 100 may update the data stored in the physical block M. During which the controller 110 selects a physical block C from the spare are 206 to replace the physical block M of the data area 204. However, while the new data is written into the physical block C, all of the valid data stored on the block M may not be moved to the physical block C immediately for erasing the physical block M. To be specific, the controller 110 copies the old valid data of the pages (i.e. pages P0 and P1) in the physical block M to be written to the physical block C (shown as (a) of FIG. 2B), and writes the new data (i.e. pages P2 and P3 of the physical block C) to the physical block C (shown as (b) of FIG. 2B). Now, the physical block C containing a part of the old valid data and the written new data is temporarily associated to a substitute physical block 208. This is because the valid data on the physical block M can be turned to invalid during a next operation (for example, write a command). Therefore, immediate movement of all of the valid data on the physical block M to the physical block C is unnecessary. In this case, integration of the data on the physical block M and the substitute physical block C is the data on the mapped logical block L. A transient relation between such mother-child blocks (i.e. the physical block M and the substitute physical block C) can be determined by the size of the buffer memory 110d within the controller 110, and five groups are taken as an example in the present exemplary embodiment. Operation for temporarily maintaining such transient relation is referred to as opening of the mother-child blocks.

Next, when the data of the physical block M and the data of the substitute physical block C need to be actually integrated, the controller 110 combines the physical block M and the physical block C to be one block, so as to improve a utilization efficiency of the blocks, and such a combination operation is referred to as closing of the mother-child blocks. For example, as shown in (c) of FIG. 2B, when the mother-child blocks are closed, the controller 110 copies the remained valid data (i.e. pages P4-PN) in the physical block M to the physical block C, and erases the physical block M and associates it to the spare area 206. Meanwhile, the physical block C is associated to the data area 204, and the logical block L in the logical-physical block mapping table is changed to map to the physical block C, so as to complete operation of closing the mother-child blocks.

Since programming specification of the flash memory 130 requires that writing has to be performed from the first page to the last page of each physical block, and under a condition that each bit can only be programmed once (i.e. can only be changed from "1" to "0"), once a page of the physical block is written with data, and if the written data is about to be renewed, a physical block has to be selected from the spare area 206 as shown in FIG. 2A, and steps shown in FIG. 2B are repeated. Therefore, before the close operation shown as (c) of FIG. 2B is performed to the physical block (i.e. in a transient state shown as (b) of FIG. 2B), if the newly moved data (for example, P0-P1 shown in FIG. 2B) has to be renewed, the moved old data then has to be moved again, which is referred to as a random write mode. For example, a file allocation table (FAT) is generally utilized in a storage device to manage the storage medium, wherein data accessing of the FAT is rather frequent. Therefore, when the FAT is accessed, the random write mode can be activated due to constant moving of the newly moved data. When the random write mode is entered, the controller 110 can sequentially write data into the physical block C, directly, and valid data moving operation shown as (a) of FIG. 2B can be omitted, so that repeat execution of the steps of FIG. 2A and FIG. 2B under the random write mode can be avoided. Moreover, after the random write mode is ended, combination of the valid data is performed.

Generally, the physical blocks frequently alternated between the data area 204 and the spare area 206 is referred to as dynamic physical blocks. Moreover, some data written in the data area 204 may keep unchanged for a long time, for example, a user may store 100 favourite MP3 songs within the data area 204, and the stored MP3 songs may keep unchanged for a long time. The physical blocks used for storing such kind of data are referred to as static physical blocks. Erase times of the static data blocks may be relatively low (i.e. low wearing extent) due to little change of the stored data. In the present exemplary embodiment, the controller 110 can execute the physical blocks switching operation between the data area 204 and the spare area 206, so that the physical blocks seldom alternated within the data area 204 now have a chance to be alternated, so as to effectively level wearing of the physical blocks. In the following content, several exemplary embodiments are provided to describe the wear leveling method with reference of drawings.

First Exemplary Embodiment

Figure 3:
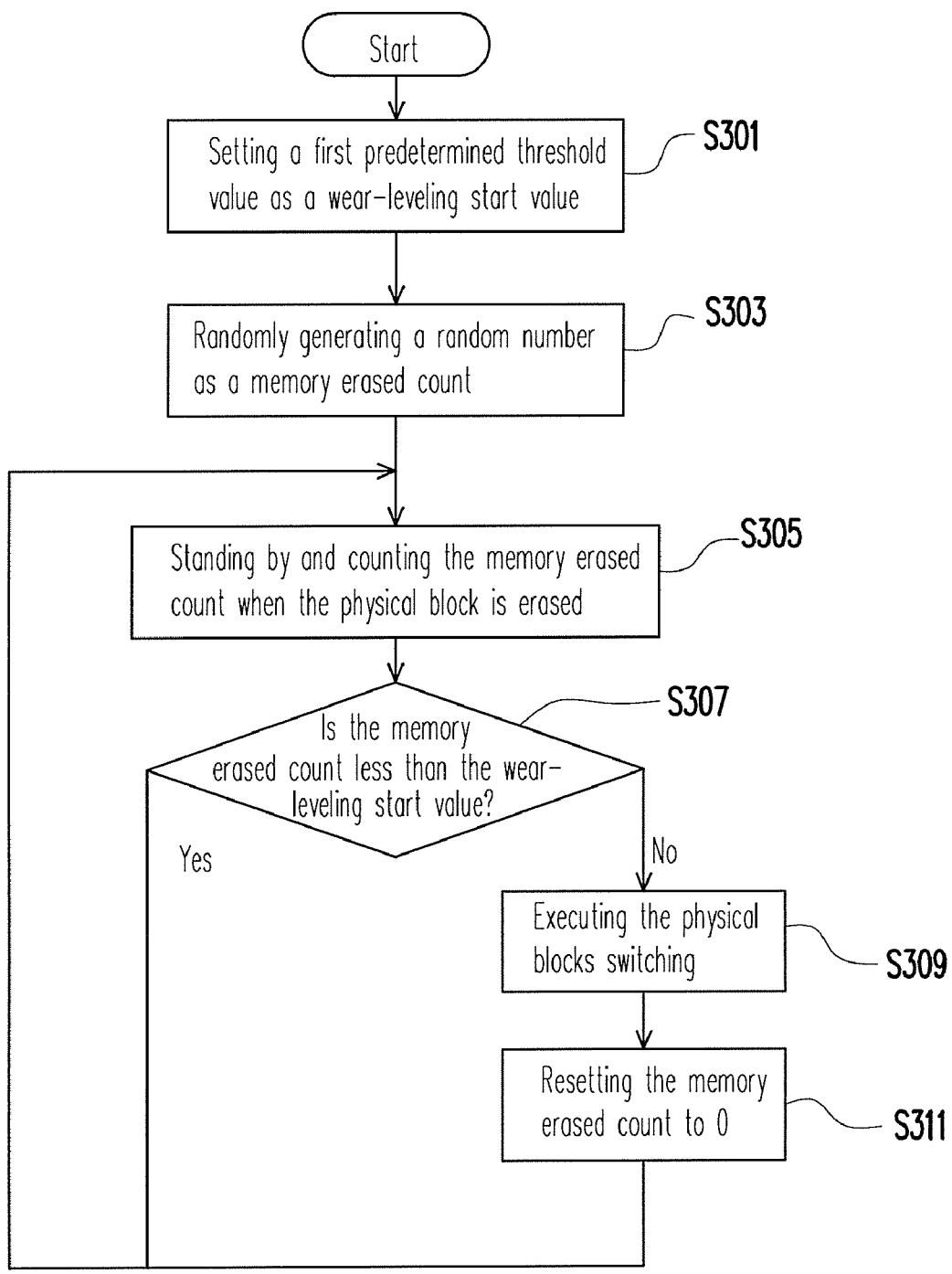
FIG. 3 is a flowchart illustrating wear leveling steps according to a first exemplary embodiment of the present invention.

FIG. 3 is a flowchart illustrating wear leveling steps according to a first exemplary embodiment of the present invention. Wherein, the wear leveling steps are implemented by executing the machine commands of the memory management module 110b through the micro-processing unit 110a of the controller 110.

Referring to FIG. 3 when the flash memory storage system 100 is booted, in step S301, a first predetermined threshold value is set to serve as a wear-leveling start value. The wear-leveling start value represents a frequency of starting the physical blocks switching operation, wherein the greater the wear-leveling start value is, the lower the frequency of starting the physical blocks switching operation is. Conversely, the smaller the wear-leveling start value is, the higher the frequency of starting the physical blocks switching operation is. A user (for example, a storage system manufacturer) can set the first predetermined threshold value according to quality of the utilized flash memory and a wear leveling effect to be achieved. It should be noted that the higher the frequency of executing the physical blocks switching operation, the better the wear leveling effect is. However, time required for executing the physical blocks switching operation can influence a performance of the flash memory storage system 100. In the present exemplary embodiment, the first predetermined threshold value is set to 500.

In step S303, a random number is randomly generated to server as a memory erased count. The memory erased count is used for counting a number of times that the physical blocks are erased during booting of the flash memory storage system 100, so as to judge whether a condition for executing the physical blocks switching is satisfied (i.e. whether the wear-leveling start value is reached). Therefore, an initial wear-leveling start value is generally set to 0. However, in case that the initial wear-leveling start value is 0, if the flash memory storage system 100 is turned off when the number of erase time of the physical blocks approaches the wear-leveling start value, the initial wear-leveling start value is then reset to 0 when the flash memory storage system 100 is rebooted, which may result in a fact that an actual frequency for executing the physical blocks switching operation is relatively low, so that the wear leveling effect is poor, and accordingly lifespan of the flash memory storage system is influenced. Consequently, in the present exemplary embodiment, the controller 110 can take the random number as the initial value of the memory erased count. It should be noted that the random number generated by the controller 110 has to be less than the set wear-leveling start value. For example, the wear-leveling start value set based on the step S301 is 500 (i.e. the first predetermined threshold value), the controller 110 then randomly generates the random number within a range of 0-500. The random number can be generated by a random number generator implemented via software or hardware, which is known by those skilled in the art, so that detailed description thereof is not repeated. Moreover, the ransom number is generated when the flash memory storage system 100 is booted.

Next, in step S305, the controller 110 stands by, and counts the memory erased count when the physical block is erased. For example, the controller 110 adds the memory erased count by 1.

Next, in step S307, whether the memory erased count is less than the wear-leveling start value is judged. If the memory erased count is judged to be not less than the wear-leveling start value in the step S307, in step S309 the physical blocks switching is then performed. To be specific, in the step S309, the controller 110 randomly selects a physical block (for example, a physical block M) from the data area 204, and randomly selects a physical block (for example, a physical block C) from the spare area 206, and then copies data on the physical block M to the physical block C. Finally, the physical block C is associated to the data area 204 and the physical block M is erased and associated to the spare area 206. Namely, the physical block C can replace the physical block M to serve as the physical block mapped to the logical block L.

It should be noted that in the present exemplary embodiment, the physical block used for switching is randomly selected from the data area 204. However, in another exemplary embodiment of the present invention, the physical blocks can be sequentially selected from the data area 204 according to a sequence of the logical blocks in the logical-physical mapping table, and the physical blocks can be sequentially selected from the spare area 206 according to a sequence of available physical blocks in an available physical block table. Here, the available physical block table is used for recording the available physical blocks in the spare area 206.

Next, in step S311, the memory erased count is reset to 0, and the step S305 is repeated. Here, the wear leveling steps are terminated when the flash memory storage system 100 is turned off.

Accordingly, in the wear leveling method of the present exemplary embodiment, when the flash memory storage system 100 is booted, the initial value of the memory erased count is set according to a random number, so that the frequency for executing the physical blocks switching operation can be more stable, and therefore the wear leveling effect can be improved, and the lifespan of the flash memory storage system 100 can be prolonged.

Second Exemplary Embodiment

Figure 4:
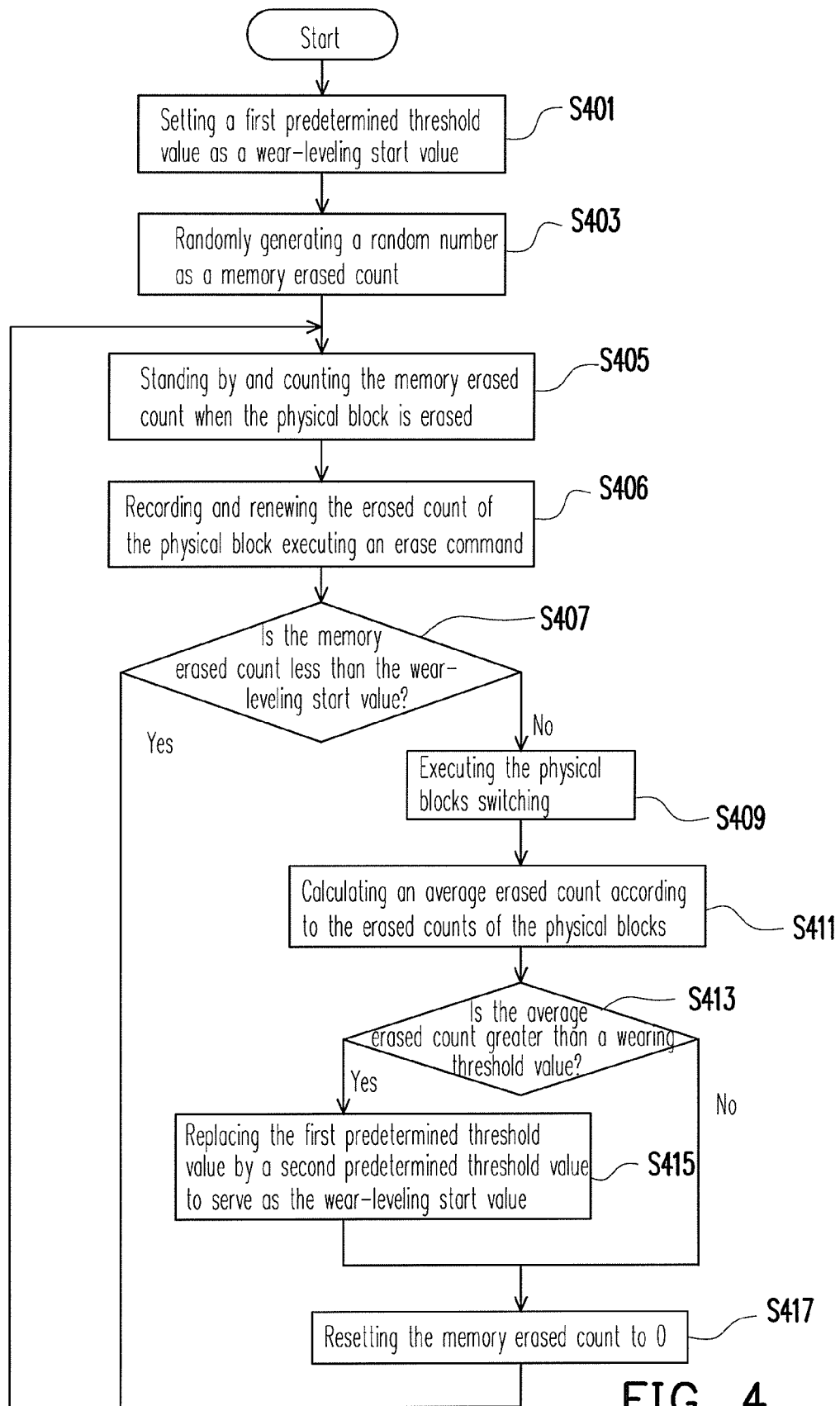
FIG. 4 is a flowchart illustrating wear leveling steps according to a second exemplary embodiment of the present invention.

FIG. 4 is a flowchart illustrating wear leveling steps according to a second exemplary embodiment of the present invention. Wherein, the wear leveling steps are implemented by executing the machine commands of the memory management module 110b through the micro-processing unit 110a of the controller 110.

Referring to FIG. 4, when the flash memory storage system 100 is booted, in step S401, a first predetermined threshold value is set to serve as a wear-leveling start value, for example, the first predetermined threshold value is set to 500. In step S403, a random number is randomly generated to server as a memory erased count. For example, the controller 110 randomly generates the random number within a range of 0-500. In step S405, the controller stands by, and counts the memory erased count when the physical block is erased. The steps S401, S403 and S405 are the same to the steps S301, S303 and S305, and detailed descriptions thereof are not repeated.

Next, in step S406, the erased count of the physical block executing an erase command is recorded and renewed. For example, the erased count of the physical block executing the erase command is added by 1. To be specific, in the present exemplary embodiment, the controller 110 records and renews the erase times of the physical blocks of the data area 204 within the logical-physical mapping table, and such information is recorded in the redundant areas R of the pages when the physical blocks are programmed. Moreover, the controller 110 records the erase times of the physical blocks of the spare area 206 within the available physical block table. Particularly, during operation of the flash memory storage system 100, the logical-physical mapping table and the available physical block table are renewed within the buffer memory 110d, and the flash memory storage system 100 is irregularly backed up to the system area 202 of the flash memory 130.

Next, in step S407, whether the memory erased count is less than the wear-leveling start value is judged. If the memory erased count is judged to be not less than the wear-leveling start value in the step S407, in step S409 the physical blocks switching is then performed. In the present exemplary embodiment, in the step S409, the controller 110 selects a physical block having a minimum erased count from the data area 204, and selects a physical block having a maximum erased count from the spare area 206 according to the erased counts of the physical blocks, and then copies data of the physical block selected from the data area 204 to the physical block selected from the spare area 206. Finally, the physical block selected from the spare area 206 is associated to the data area 204 and the physical block selected from the data area 204 is erased and associated to the spare area 206. Namely, the physical block selected from the spare area 206 can replace the physical block selected from the data area 204 to serve as the physical block mapped to the logical block.

Next, in step S411, an average erased count is calculated according to the erased counts of the physical blocks, wherein the average erased count is an average erase times of all of the physical blocks within the flash memory 130. Next, in step S413, whether the average erased count is greater than a wearing threshold value is judged, wherein the wearing threshold value is determined by the user or by the manufacturer of the flash memory storage system 100. Here, the wearing threshold value represents the erase times of the physical block nearly to be damaged. In the present invention, the wearing threshold value is set to be 90% of the standard erase times of the flash memory 130. For example, if the standard erase times of the flash memory 130 is 10000, in the present exemplary embodiment, the wearing threshold value is then set to be 9000.

In the step S413, if the average erased count is judged to be greater than the wearing threshold value, in step S415, a second predetermined threshold value then replaces the first predetermined threshold value to serve as the wear-leveling start value, wherein the second predetermined threshold value is less than the first predetermined threshold value. The second predetermined threshold value can also be pre-determined by the user (for example, the manufacturer of the flash memory storage system 100). In the present exemplary embodiment, the second predetermined threshold value is set to be 15% of the first predetermined threshold value. For example, the second predetermined threshold value is set to be 75 (=500×15%). In the present exemplary embodiment, executions of the steps S413 and S415 are to judge whether a utilization (or erase) extent of the physical block of the flash memory storage system 100 approaches a damage extent, and when the physical block of the flash memory storage system 100 approaches the damage extent, in the present exemplary embodiment, the frequency of executing the physical blocks switching is improved, so as to level wearing of the physical blocks and prolong the lifespan of the flash memory storage system.

Next, in step S417, the memory erased count is reset to 0, and the step S405 is repeated. Here, the wear leveling steps are terminated when the flash memory storage system 100 is turned off.

It should be noted that though the first predetermined threshold value is taken as the wear-leveling start value when the flash memory storage system 100 is booted, and in the steps S413 and S415 the second predetermined threshold value is taken as the wear-leveling start value according to whether a present average erased count is greater than the wearing threshold value. However, in another exemplary embodiment, whether the present average erased count is greater than the wearing threshold value, or whether the erase times of at least one physical block reaches the wearing threshold value is first confirmed when the flash memory storage system 100 is booted. If the average erased count is greater than the wearing threshold value, the second predetermined threshold value is then directly set as the wear-leveling start value.

Moreover, as described above, the logical-physical mapping table and the available physical block table are updated within the buffer memory 110d, and are irregularly backed up to the system area 202 of the flash memory 130. Therefore, when the flash memory storage system 100 is turned off, the erase times of the physical blocks are probably not updated and backed up to the system area 202 in time, which may leads to an inaccurate recording of the erase times of the physical blocks. It should be noted that since the erase times of the physical blocks of the data area 204 are recorded in the redundant areas R of the pages, when the flash memory storage system 100 is rebooted, the erase times of the physical blocks of the data area 204 recorded within the logical-physical mapping table can be correctly renewed. As to the physical blocks of the spare area 206, the wear leveling method of another exemplary embodiment of the present invention further includes adjusting the erased counts of the physical blocks of the spare are 206 when the flash memory storage system 100 is booted, so that the erase times of the physical blocks of the spare area 206 can be more accurate. For example, when the storage system is booted, the erased count of each of the physical blocks of the spare area 206 is added by an adjusting number. Namely, the erased counts of certain physical blocks are randomly adjusted. Moreover, such adjusting number is set according to an integer value obtained via dividing the wear-leveling start value by the number of the physical blocks of the spare area 206. For example, if the wear-leveling start value is 500, and the number of the physical blocks of the spare area 206 is 384, the adjusting number then equals to 1.

In summary, in the wear leveling method of the present invention, since the memory erased count is set according to the random number each time when the flash memory storage system is booted, a problem that the physical blocks switching is not performed for a long time due to frequent turning on/off of the flash memory storage system can be avoided, so that wearing of the physical blocks can be levelled to prolong the lifespan of the flash memory storage system. Moreover, in the present invention, the wear-leveling start value can be reset according to a present utilization state of the flash memory for executing the physical blocks switching in a relatively high frequency, so that wearing of the physical blocks can be further levelled to prolong the lifespan of the flash memory storage system.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A wear leveling method, adapted to a flash memory of a storage system, wherein the flash memory comprises a plurality of physical blocks grouped into at least a data area and a spare area, the wear leveling method comprising:
    setting a first predetermined threshold value as a wear-leveling start value;
    randomly generating a random number as a memory erased count, wherein the random number is less than the wear-leveling start value;
    counting the memory erased count each time when the physical blocks are erased; and
    determining whether the memory erased count is less than the wear-leveling start value, wherein a physical blocks switching is performed between the data area and the spare area when the memory erased count is not less then the wear-leveling start value.

2. The wear leveling method as claimed in claim 1, wherein the step of performing the physical blocks switching between the data area and the spare area includes:
    respectively selecting a physical block from the data area and the spare area;
    copying data on the physical block selected from the data area to the physical block selected from the spare area;
    associating the physical block selected from the data area with the spare area; and
    associating the physical block selected from the spare area with the data area.

3. The wear leveling method as claimed in claim 2, further comprising:
    recording an erased count of each of the physical blocks; and
    counting the erased count of the erased physical block each time when the physical blocks are erased.

4. The wear leveling method as claimed in claim 3 wherein the step of respectively selecting a physical block from the data area and the spare area includes:
    selecting a physical block having a minimum erase times from the data area; and
    selecting a physical block having a maximum erase times from the spare area.

5. The wear leveling method as claimed in claim 2, wherein the step of respectively selecting a physical block from the data area and the spare area includes sequentially or randomly selecting a physical block from the data area and the spare area, respectively.

6. The wear leveling method as claimed in claim 3, further comprising:
    calculating an average erased count according to the erased counts of the physical blocks;
    judging whether the average erased count is greater than a wearing threshold value; and
    replacing the first predetermined threshold value by a second predetermined threshold value to serve as the wear-leveling start value when the average erased count is grater than the wearing threshold value, wherein the second predetermined threshold value is less than the first predetermined threshold value.

7. The wear leveling method as claimed in claim 3 further comprising adjusting the erased counts of the physical blocks of the spare area when the storage system is booted.

8. The wear leveling method as claimed in claim 1, wherein the step of randomly generating the random number as the memory erased count is executed while the storage system is booted.

9. The wear leveling method as claimed in claim 3, further comprising:
    judging whether the erased count of each of the physical blocks is greater than the wearing threshold value; and
    replacing the first predetermined threshold value by a second predetermined threshold value to serve as the wear-leveling start value when at least one of the erased count of the physical blocks is grater than the wearing threshold value, wherein the second predetermined threshold value is less than the first predetermined threshold value.

10. The wear leveling method as claimed in claim 7, wherein the step of adjusting the erased count of the physical block of the spare area includes adding the erased count of the physical block of the spare area by an adjusting number.

11. A controller, adapted to a storage system having a flash memory, wherein the flash memory comprises a plurality of physical blocks grouped into at least a data area and a spare area, the controller comprising:
    a micro-processing unit;
    a flash memory interface module, coupled to the micro-processing unit;
    a host interface module, coupled to the micro-processing unit;
    a buffer memory, coupled to the micro-processing unit; and
    a memory management module, coupled to the micro-processing unit, and having a plurality of machine commands that can be executed by the micro-processing unit for executing a plurality of wear leveling steps to the flash memory, the wear leveling steps comprise:
    setting a first predetermined threshold value as a wear-leveling start value;
    randomly generating a random number as a memory erased count, wherein the random number is less than the wear-leveling start value;
    counting the memory erased count each time when the physical blocks are erased; and
    determining whether the memory erased count is less than the wear-leveling start value, wherein a physical blocks switching is performed between the data area and the spare area when the memory erased count is not less then the wear-leveling start value.

12. The controller as claimed in claim 11, wherein the step of performing the physical blocks switching between the data area and the spare area includes:

respectively selecting a physical block from the data area and the spare area;

copying data on the physical block selected from the data area to the physical block selected from the spare area;

associating the physical block selected from the data area to the spare area; and associating the physical block selected from the spare area to the data area.

13. The controller as claimed in claim 12, wherein the wear leveling steps further comprise:

recording an erased count of each of the physical blocks; and counting the erased count of the erased physical block each time when the physical blocks are erased.

14. The controller as claimed in claim 13, wherein the step of respectively selecting a physical block from the data area and the spare area includes:

selecting a physical block having a minimum erase times from the data area; and selecting a physical block having a maximum erase times from the spare area.

15. The controller as claimed in claim 12, wherein the step of respectively selecting a physical block from the data area and the spare area includes sequentially or randomly selecting a physical block from the data area and the spare area, respectively.

16. The controller as claimed in claim 13, wherein the wear leveling steps further comprise:

calculating an average erased count according to the erased counts of the physical blocks;

judging whether the average erased count is greater than a wearing threshold value; and replacing the first predetermined threshold value by a second predetermined threshold value to serve as the wear-leveling start value when the average erased count is grater than the wearing threshold value, wherein the second predetermined threshold value is less than the first predetermined threshold value.

17. The controller as claimed in claim 13, wherein the step of adjusting the erased count of the physical block of the spare area includes adding the erased count of the physical block of the spare area by an adjusting number.

18. A storage system, comprising:

a flash memory, having a plurality of physical blocks grouped into at least a data area and a spare area;

a connector; and a controller, electrically connected to the flash memory and the connector, the controller executing a plurality of machine commands of a memory management module to execute a plurality of wear leveling steps, and the wear leveling steps comprising:

setting a first predetermined threshold value as a wear-leveling start value;

randomly generating a random number as a memory erased count, wherein the random number is less than the wear-leveling start value;

counting the memory erased count each time when the physical blocks are erased; and determining whether the memory erased count is less than the wear-leveling start value, wherein a physical blocks switching is performed between the data area and the spare area when the memory erased count is not less then the wear-leveling start value.

19. The storage system as claimed in claim 18, wherein the step of performing the physical blocks switching between the data area and the spare area includes:

respectively selecting a physical block from the data area and the spare area;

copying data on the physical block selected from the data area to the physical block selected from the spare area;

associating the physical block selected from the data area to the spare area; and associating the physical block selected from the spare area to the data area.

20. The storage system as claimed in claim 19, wherein the wear leveling steps further comprise:

recording an erased count of each of the physical blocks; and counting the erased count of the erased physical block each time when the physical blocks are erased.

* * * * *